INVENTOR:
RICHARD T. ZIEMBA,
BY *Harry C. Burgess*
HIS ATTORNEY.

United States Patent Office 3,738,872
Patented June 12, 1973

3,738,872
MINIATURIZED THERMAL CELL
Richard T. Ziemba, Burlington, Vt., assignor to
General Electric Company
Continuation-in-part of application Ser. No. 595,884,
Nov. 21, 1966. This application Jan. 2, 1968, Ser.
No. 695,144
Int. Cl. F42b 13/12; F42c 19/00; H01m 21/14
U.S. Cl. 136—90                                          11 Claims

ABSTRACT OF THE DISCLOSURE

A thermal cell is provided having a housing made up of a case forming one terminal, a pin connector forming the remaining terminal, and an insulative spacer therebetween. A normally solid and nonconductive thermally fusible electrolyte is positioned within the housing in contact with a first electrode in electrical contact with the negative terminal and a cathodic depolarizer in electrical contact with a positive terminal. Thermitic material is mounted in thermally conductive relation with the electrolyte, and is ignited by a cap. The cap is positioned between two rigid surfaces, one of which is a relatively displaceable striker element. In service the thermal cell is mounted in the nose of a H.E. projectile and connected to a coil actuated detonator charge through a voltage actuated switch.

BACKGROUND OF THE INVENTION

This application is a continuation-in-part of the subject matter of my copending application Ser. No. 595,884, filed Nov. 21, 1966, now abandoned. The invention relates to thermal cells and, more particularly, to improvements in a miniaturized thermal cell useful in relatively small munitions fuze applications.

As used herein the term "thermal cell" designates a device capable of converting chemical energy into electrical energy when raised to a predetermined temperature level. The term "thermal cell unit" is herein used to designate either a thermal cell or a battery of such cells. Typically a thermal cell is comprised of an electrically conductive outer case which serves as the negative pole and current collector of a first electrode contained within the case. Insulatively mounted in spaced relation from the outer case is an inner, positive pole or second electrode. Within the case a normally solid, fusible electrolyte provides, in the fused condition thereof, an ionic conduction path between the first electrode and the positive pole of the cell. In this construction the cathode depolarizer of the cell is distributed within the electrolyte so that the cathode reduction reaction occurs at the interface of the electrolyte and the inner surface of the positive pole. In an alternate form, the second electrode may be a structural element which is in electronically conductive relation with the positive pole. Contained in the cell is means, such as a "gasless" heat paper, for example, to liberate sufficient heat energy to fuse the electrolyte when its combustion is initiated by a suitable ignition device. Typically, a thermal cell reaches its rated output, e.g., 1.5–2.2 volts, within several hundred milliseconds after ignition of the heat liberating means. Thermal cell units have been found to be particularly useful in munitions fuzing mechanisms.

In the smaller ammunition sizes, e.g., 20 mm., however, a problem has arisen due primarily to the increasing percentage of total unit volume occupied by the cell initiating mechanism. This is a problem since the more room occupied by the initiating mechanism the less room available for cell components, particularly the heat generating means. A reduction in the available quantity of heat generating material adversely affects voltage rise time and active life of the cell unit. Additionally, limitations in the size of cell electrodes create a high current density condition which, in turn, results in a cell unit having high internal resistance and a correspondingly lower ability to support an external load. It would be desirable, therefore, to devise a smaller, yet effective cell unit initiating mechanism to eliminate the sometimes complex mechanical primer initiating mechanisms normally employed.

Accordingly, it is the general object of my invention to provide an improved high explosive projectile and thermal cell unit therefor exhibiting a reduction in cell unit displacement without a corresponding sacrifice in performance.

A more specific object of the invention is to provide an improved miniaturized thermal cell unit which may be used in smaller caliber ammunition fuzing mechanisms wherein the active life of the cell unit is lengthened and the voltage rise time is reduced.

SUMMARY OF THE INVENTION

In one aspect, my invention is directed to a thermal cell unit comprised of a sealed housing forming an inner chamber. The housing is comprised of a first electronically conductive portion forming a negative terminal, a second electronically conductive portion forming a positive terminal, and insulative means separating said first and second portions. A first electrode lies within the housing in electronically conductive relation with the negative terminal while a second electrode lies within the housing in electronically conductive relation with the housing portion forming the positive terminal. Thermally fusible electrolyte means lie in intimate contact with the first and second electrodes. Thermitic material lies within the housing in thermally conductive relation with the electrolyte means. Means are provided for igniting the thermitic material in response to rapid acceleration of a projectile containing the cell unit. The igniting means include first and second means providing first and second rigid surfaces, respectively, spaced longitudinally of the cell unit. Explosive means are mounted between the rigid surfaces, and the first means is moveable with respect to the second means in response to rapid acceleration of the thermal cell unit so as to suddenly and violently compress the explosive means between the rigid surfaces to detonate the explosive means, thereby to cause ignition of the thermitic material.

My invention may be better understood by reference to the following detailed description, including the claims appended thereto, and the accompanying drawings, in which FIG. 1 is a cross-section of the forward or projectile portion of a H.E. artillery shell having an arming fuze mechanism incorporating one embodiment of my invention;

DESCRIPTION OF THE INVENTION

Figure 1:
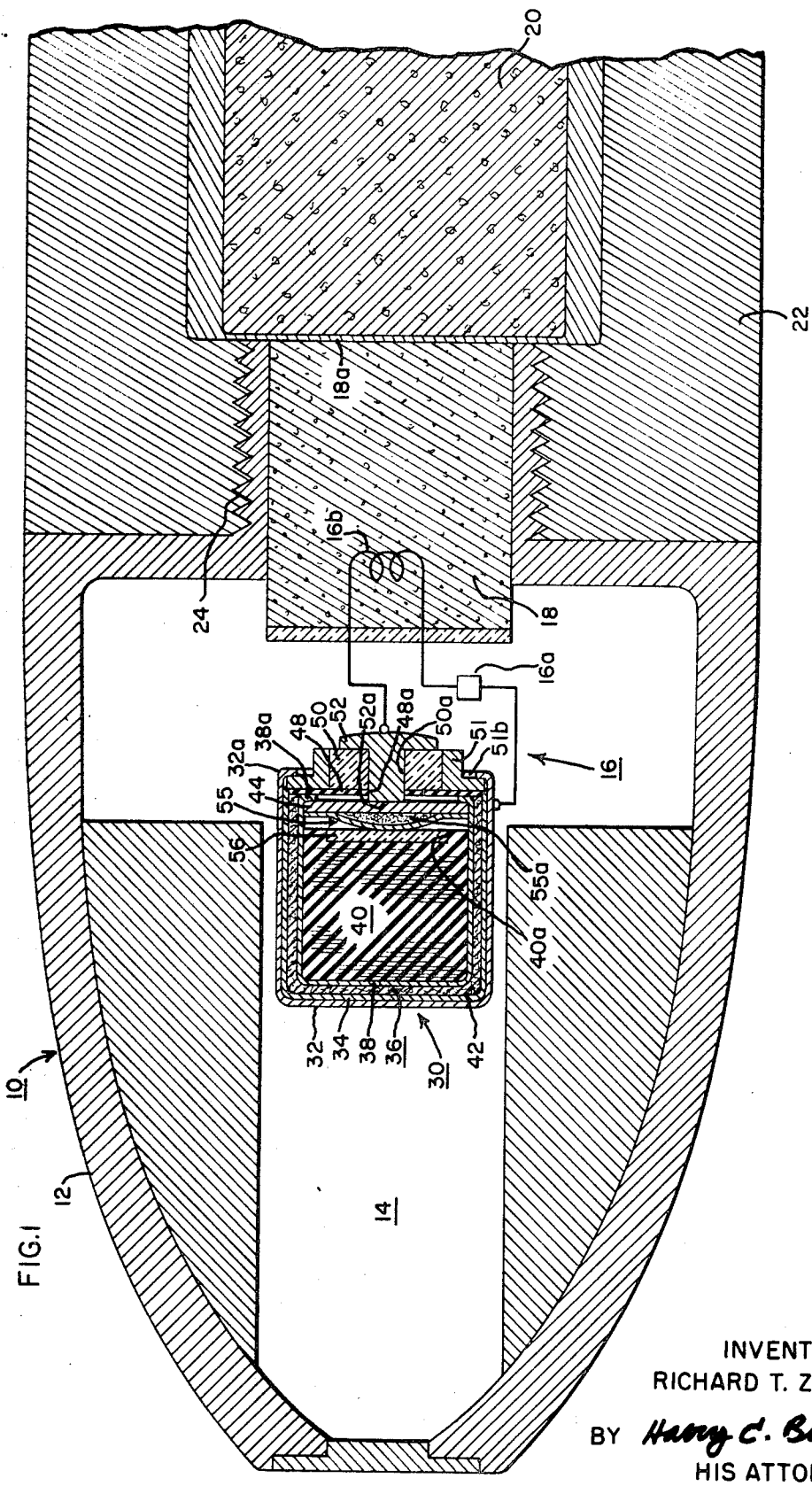

Turning now to FIG. 1, indicated generally at 10 is a partial view of a high explosive (H.E.) artillery or cannon shell of a relatively small caliber, e.g., 20 mm. or smaller. The shell has an outer housing or hollow nose portion 12, a cavity 14, and a fuze mechanism including electrical circuit means, indicated generally at 16. The electrical circuit is arranged to set off a detonator charge 18. The main or H.E. charge 20 is contained within the main shell body 22. The nose 12 containing the electrical fuzing circuitry and detonator charge is threadedly engaged at 24 with the main shell body.

Indicated generally at 30 is the improved miniature thermal cell unit of my invention. I have provided in the FIG. 1 embodiment, in combination, an improved thermal cell unit including an outer case 32, preferably constructed of ferrous metal, which comprises the negative pole or terminal of the cell. Inside the outer case or main supporting structure of the cell I provide an inner cup 34, preferably constructed of magnesium, which acts as a first electrode of the cell. Calcium could be used also as the anode material, since both magnesium and calcium have very similar physical and electrochemical properties. In view of the very low quantities of electrode material required for most applications, it is recognized that magnesium or calcium clad steel may be used to form the outer case 32 and no separate electrode provided.

Within the outer case I provide an inner structure indicated generally at 36. The inner structure consists of a "heat capsule" including a cup 38, preferably constructed of a highly thermally conductive material, such as brass or copper, coated with a corrosion resistant conductive metal, such as nickel. The cup serves as the current collector for a second electrode and also as a container for a quantity of thermal initiating or heat generating material indicated at 40.

In the illustration, the thermal initiating material comprises a quantity of so-called "gasless" heat paper, i.e., layers of paper impregnated with a suitable thermitic composition, e.g., a mixture of barium chromate and zirconium. The paper is, of course, formed of a fibrous noncombustible material, such as fiberglass, etc. The heat generating material may take other forms, however, such as a reductant in the form of finely powdered iron and an oxidant, such as a chromate or perchlorate.

In the cell 30, the heat paper fuses the normally solid electrolyte primarily by conduction (but with some radiation) by the transfer of heat through the walls of the cup, which are specifically formed to provide a maximum heat transfer coefficient. The electrolyte is solid and ionically non-conductive at the ambient temperatures prevailing prior to ignition of the heat paper. A preferred form of the electrolyte, which is indicated at 42, comprises a woven glass cloth or tape impregnated with a eutectic mixture of alkali halide salts, e.g., an alkali chloride eutectic, such as lithium and potassium chlorides, which have a melting point in the range of 300–400 C. Other fusible salts and salt mixtures having dissimilar melting ranges may be utilized, if desired. The electrolyte may also comprise a pelletized material having an inorganic binder; but for most applications the impregnated woven fiberglass cloth is sufficient as a separator between the first electrode and the cup. A cathodic depolarizer, e.g., ferric oxide, vanadium pentoxide, or potassium chromate, is added to the fused electrolyte mixture 42 during or prior to manufacture of the cell. Alternately, a separate electrode formed of one of these materials may be adhered to the outer surface of the heat capsule 38. It is recognized that a variety of compatible anode, cathode, and electrolyte materials are known in addition to the preferred compositions specifically set out and may be substituted singly or in combination for those disclosed.

To complete the cell structure and provide environmental protection and mechanical integrity a closure disc 44 is placed just within the walls of the cup 38, of the "heat capsule" 36 and the lip of the cup is thereafter bent over at 38a. An electrically insulative washer 48 is positioned to overlie the lip of the cup 38. The washer is topped by an additional sealing member in the form of a glass sealing header 50 positioned centrally in the case opening by a collar 51. After the glass header is placed over the washer the lip of the steel cup is rolled over at 32a to grip collar 51 and soldered at 51b to seal the cell. Contact with the second electrode current collector (cup 38) of the cell is established by pin 52 which extends through a hole 50a in the glass header and is gripped tightly thereby. The pin has a body portion projecting through a clearance hole 48a in the washer 48 and into contact with the closure disc 44 at 52a. The portion of the pin lying exteriorly of the heater acts as a positive terminal of the cell.

A primary feature of my improved thermal cell is the provision of a low mass, low volume initiating mechanism. To this end, I have provided detonating cap 55 and a striker plate 56. The cap 55 contains a small amount of explosive powder 55a enclosed in a thin-walled paper packet. The cap rests against the closure disc 44, i.e., it is captured tightly between the disc and the striker plate. For improved operation the striker comprises a heat resistant material, such as a ceramic, so as to provide a poor heat sink. The striker simply rests in a depression 40a in the thermitic material.

From the foregoing it is apparent that the case or negative terminal 32, the pin or positive terminal 52, and the glass header 50, which serves as an insulative means therebetween cooperate to form a sealed housing having an inner chamber. The first and second electrodes of the cell lie within the housing in contact with the negative and positive terminals, respectively. The electrolyte means lies in intimate contact with the anode and the cathode, and the thermitic material lies in thermally conductive relation with the electrolyte means. The closure disc 44 and striker plate 56 provide first and second longitudinally spaced rigid surfaces which are relatively moveable in response to rapid acceleration of the projectile, and the cap 55 constitutes an explosive means which may be detonated by the relative movement of the surfaces.

Figure 2:
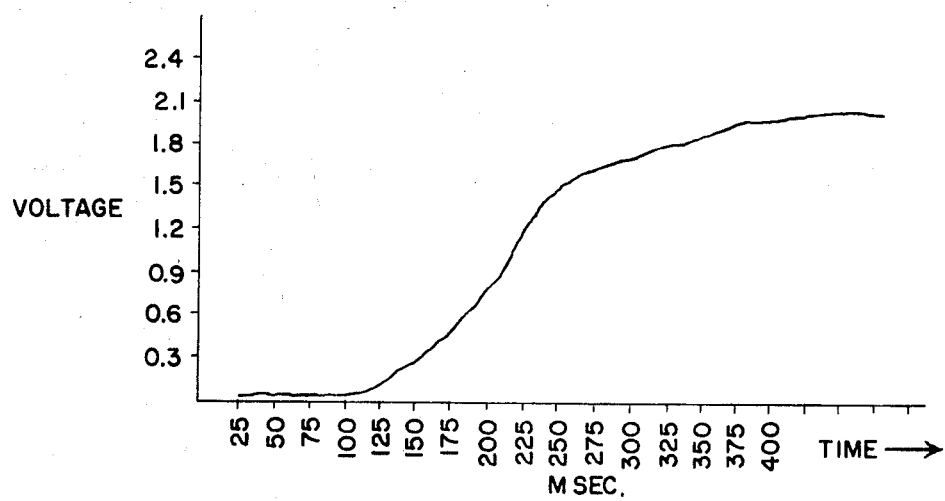
FIG. 2 is a chart of observed rise time for the improved thermal cell unit of the invention according to FIG. 1.

In operation, when the projectile is fired, the set-back forces of the accelerating shell "shock" the striker plate against the cap 55. The cap is suddenly squeezed between the closure disk and plate and explodes. The resulting flame ignites the heat paper 40. As the heat paper is consumed, the combustion process fuses and liquifies the initially solid electrolyte, giving rise to an electric potential between the cell terminals 32 and 52. As illustrated in FIG. 1 the voltage output between the pin 52 and outer case 32 is applied to circuit 16. Upon reaching a predetermined potential difference between the terminals a suitable switching device 16a, such as a silicon controlled rectifier, Zener diode, or the like, permits current flow through a trigger coil 16b buried in the detonating fuze charge 18. Heating of the coil 16b sets off charge 18, which in turn, ignites the main H.E. charge by rupturing the thin retainer wall 18a in the fuze nose portion 12. My improved initiating mechanism does away with the larger conventional primer arrangements and, accordingly, a greater quantity of thermitic material can be utilized. This means an increase in the active life of the cell unit. For example, in one embodiment an active life of upwards of 9 seconds was achieved. Additionally, voltage rise time is faster than would otherwise be the case with a cell unit of this size, since a greater quantity of thermitic material provides greater design flexibility with regard to choice of burning rate, i.e., type of thermitic material. Observed rise time to rated voltage with one particular electrolyte is indicated in FIG. 2.

Figure 3:
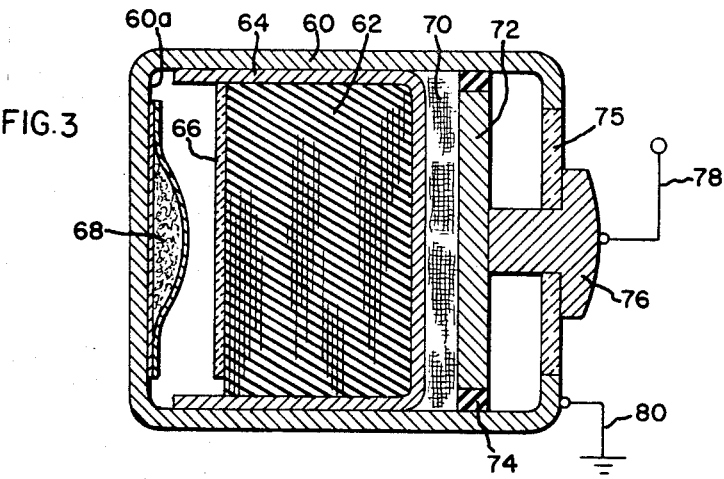
FIG. 3 is a cross-sectional view of a further embodiment of my improved miniaturized thermal cell unit.

Another embodiment of my improved miniaturized thermal cell unit construction is indicated in FIG. 3. The thermal cell construction has been further simplified for low cost and reduced size. In this illustration, an outer case 60 provides means protecting the active elements from the environment, as well as serving as the cell's positive terminal. A thermitic material, e.g., layered heat paper 62, is enclosed by a press-fitted brass or copper inner cup 64. Enclosed in the "heat capsule" compartment formed by cup 64 is a ceramic striker plate 66. Positioned between the plate 66 and the bottom inside wall 60a of case 60 is an explosive cap 68. The cap 68 is squeezed between the plate and wall by the initial accelerating force of the projectile and explodes, igniting heat paper 62. The heat generated by the burning paper is transmitted by conduction through cap 64, melting the fusible salt electrolyte indicated at 70. In the form shown the cathodic depolarizer is dispersed in the electrolyte, although this material could as well be adhered to the surface of the cup 64 to form a separate cathode element at the electrolyte interface with the cup. A magnesium closure disc 72 forms the negative electrode of the cell, the disc being insulated from a case 60 by an annular washer 74. A glass header 75 seals the cell and supports contact pin 76 in abutment with the disc 72. The portion of the contact pin lying externally of the case serves as a negative terminal for the cell. Leads 78 and 80 provide power to an electrical circuit, not shown, which may be identical to that illustrated in FIG. 1, for utilization of the cell unit potential.

What I claim and desire to secure by Letters Patent of the United States is:

1. In a thermal cell unit having a container, a pair of electrodes, a normally solid electrically non-conductive electrolyte separating said electrodes, and a quantity of thermitic material combustible to melt said electrolyte, the improvement of means for igniting said thermitic material, said ignition means comprising:
    a substantially flat rigid striker plate loosely positioned in said container for longitudinal movement with respect to the axis thereof;
    a relatively small quantity of powder; and
    means encapsulating said powder including a relatively thin, flat packet disposed between said striker plate and an interior wall of said container nominally parallel thereto,
    said plate being movable to shock said packet against said wall on sudden acceleration of said battery in a direction substantially along the longitudinal axis thereof, thereby to explode said powder and ignite said thermitic material.

2. A thermal cell unit for use in relatively small caliber projectile fuse-type arming mechanisms, said thermal cell unit comprising:
    an outer casing providing a first electrode in said cell;
    an inner cup member providing a second electrode in said cell;
    liquid-tight closure means mechanically sealing said casing, said closure means being electrically insulated from said casing and electrically connected to said cup member;
    a normally non-conductive, solid electrolyte contained in said cell between said electrodes, said electrolyte having a predetermined melting point at which it becomes electrically conductive for activation of said cell;
    a quantity of thermitic material contained in said cup member; and
    means to initiate combustion of said thermitic material including,
        a relatively small quantity of explosive powder,
        a thin, substantially flat packet containing said powder, and,
        a rigid striker plate loosely received in said cup member, said packet resting between said striker plate and a wall of said casing, said packet being suddenly and violently compressed between said plate and said wall by set-back forces accompanying initial projectile acceleration, thereby to explode said powder to cause ignition of said thermitic material.

3. A thermal cell unit comprising:
    a sealed container forming an inner chamber, said container being comprised of a first electronically conductive portion forming a negative terminal, a second electronically conductive portion forming a positive terminal, and insulative means separating said first and second portions;
    a first electrode lying within said container in electronically conductive relation with said negative terminal;
    a second electrode lying within said container in electronically conductive relation with said container forming said positive terminal;
    thermally fusible electrolyte means lying in intimate contact with said first and second electrodes;
    thermitic material lying within said container and in thermally conductive relation with said electrolyte means, and
    means disposed within said container for igniting said thermitic material in response to rapid acceleration of said thermal cell unit including
        first and second means providing first and second longitudinally spaced rigid surfaces, respectively,
        explosive means mounted between said longitudinally-spaced rigid surfaces, and
        said first means being moveable with respect to said second means in response to rapid acceleration of said thermal cell unit so as to suddenly and violently compress said explosive means between said rigid surfaces to detonate said explosive means thereby to cause ignition of said thermitic material.

4. In a H.E. projectile including an outer housing having a central cavity therein, a detonator charge in said cavity, and a fuze mechanism including electrical circuit means operable to set off said detonator charge to explode the projectile;
    the improvement comprising a thermal cell unit forming a power source for said electrical circuit means, said unit comprising:
    a sealed container forming an inner chamber, said container being comprised of a first electronically conductive portion forming a negative terminal, a second electronically conductive portion forming a positive terminal, and insulative means separating said first and second portions;
    a first electrode lying within said container in electronically conductive relation with said negative terminal;
    a second electrode lying within said container in electronically conductive relation with said container portion forming said positive terminal;
    thermally fusible electrolyte means lying in intimate contact with said first and second electrodes;
    thermitic material lying within said container and in thermally conductive relation with said electrolyte means; and
    means disposed within said container for igniting said thermitic material in response to rapid acceleration of said projectile including,
        first and second means providing first and second longitudinally-spaced rigid surfaces, respectively, and
        explosive means mounted between said longitudinally-spaced rigid surfaces; and
        said first and second means being relatively moveable with respect to each other in response to rapid acceleration of said projectile so as to suddenly and violently compress said explosive means between said rigid surfaces to detonate said explosive means thereby to cause ignition of said thermitic material.

5. A H.E. artillery projectile comprising, in combination:
    an outer housing having a central cavity therein;
    a detonator charge in said cavity;
    a fuse mechanism including electrical circuit means operable to set off said detonator charge to explode the H.E. projectile; and
    an improved power source for said electrical circuit means comprising,
        a thermal battery having an outer casing providing a first electrode,
        an inner cup member providing a second electrode,
        a quantity of normally solid, electrically non-conductive elctrolyte between said electrodes, a quantity of thermitic material sealed within said cup member, and means to initiate combustion of said thermitic material to melt said electrolyte for electrical activation thereof including a relatively small quantity of explosive powder;

said powder being entrained between said thermitic material and a wall of said cup, so as to be suddenly and violently compressed against said wall by set-back forces accompanying initial projectile acceleration, thereby to explode said powder to cause ignition of said thermitic material.

6. A thermal cell, comprising:

a first, cup shaped, electrode means;

a second cup shaped, electrode means, disposed within and spaced from said first electrode means, and longitudinally coextensive with said first electrode means;

a fusible electrolyte means, non-conducting at normal temperatures, cup shaped, disposed between said first and second electrode means, and longitudinally substantially coextensive therewith; and a thermitic material and acceleration responsive ignition means assembly disposed within said second electrode means, and adapted, upon acceleration of said cell, to become ignited and to fuse said electrolyte, whereby to activate said cell to develop an electric potential between said electrode means;

said first and second electrode means and said electrolyte means being mutually telescoped.

7. A thermal cell according to claim 6 wherein:

said assembly acceleration responsive ignition means includes:

an anvil, a hammer spaced from said anvil and adapted, upon acceleration of said cell, to impact against said anvil, and a relatively small quantity of powder captured between said anvil and said hammer, and adapted to be exploded by said hammer upon impaction against said anvil and to ignite said thermitic material.

8. A thermal cell according to claim 7 wherein: said hammer is made of a heat resistant material to provide a poor heat sink.

9. A thermal cell according to claim 7, wherein: said quantity of powder is enclosed in a thin walled paper packet which is captured between said hammer and said anvil.

10. A fuse for an explosive device, comprising:

a thermal cell according to claim 7, a detonator charge;

an electrical heating coil and a normally open, potential sensitive, switch in series and electrically coupled between said electrode means.

11. A fuse according to claim 10 adapted for insertion into a projectile having a longitudinal axis, wherein: said hammer is spaced from said anvil along said longitudinal axis and is adapted to impact said captured powder upon set-back.

References Cited

UNITED STATES PATENTS

| 2,217,645 | 10/1940 | DeWilde et al. | 102—66 |
| 2,363,024 | 11/1944 | Thibodeau | 102—56 |
| 2,364,643 | 12/1944 | Moore et al. | 102—56 |
| 2,934,017 | 4/1960 | Ellett | 102—70.2 |
| 3,079,454 | 2/1963 | McGinnis | 136—90 |
| 3,101,054 | 8/1963 | Stevenson et al. | 102—70.2 |
| 3,120,187 | 2/1964 | Wyser | 102—70.2 |
| 3,281,273 | 10/1966 | Oser | 136—86 |
| 3,323,459 | 6/1967 | Buffet | 102—70.2 |
| 3,421,941 | 1/1969 | Osborne et al. | 136—90 X |
| 3,425,872 | 2/1969 | Levy | 136—83 |

BENJAMIN A. BORCHELT, Primary Examiner

C. T. JORDAN, Assistant Examiner

U.S. Cl. X.R.

102—56, 70.2 R; 136—83 T